United States Patent [19]
Hustak et al.

[11] Patent Number: 5,651,616
[45] Date of Patent: Jul. 29, 1997

[54] TAPERED BEARING HOUSING

[75] Inventors: Jerome F. Hustak; Martin D. Maier, both of Olean, N.Y.

[73] Assignee: Dresser-Rand Company, Corning, N.Y.

[21] Appl. No.: 733,625

[22] Filed: Oct. 17, 1996

[51] Int. Cl.$^6$ .................................................. F16C 27/02
[52] U.S. Cl. ................................................. 384/99; 384/119
[58] Field of Search ........................... 384/99, 117, 119, 384/247, 267, 271, 309

[56] References Cited

U.S. PATENT DOCUMENTS

| | | | |
|---|---|---|---|
| 2,972,504 | 2/1961 | Baker | 384/99 |
| 3,416,300 | 12/1968 | Schenkel | 57/77 |
| 3,716,280 | 2/1973 | Liebensperger et al. | 384/448 |
| 4,366,994 | 1/1983 | Yoshioka | 384/99 |
| 4,392,751 | 7/1983 | Ida et al. | 384/99 |
| 4,423,541 | 1/1984 | Marshall | 29/117 |
| 4,460,283 | 7/1984 | Yoshioka et al. | 384/119 |
| 4,626,111 | 12/1986 | Swasey et al. | 384/99 |
| 4,783,179 | 11/1988 | Katayama et al. | 384/99 X |
| 5,215,384 | 6/1993 | Maier | 384/99 |
| 5,251,985 | 10/1993 | Monzel | 384/99 |

*Primary Examiner*—Thomas R. Hannon
*Attorney, Agent, or Firm*—Sidley & Austin

[57] ABSTRACT

A bearing structure having an annular cage and an annular housing that optionally mate at frustogeometrical surfaces for supporting and positioning a rotatable shaft of a turbomachine and that optionally provides a squeeze film damper between the frustogeometrical surfaces of the annular cage and the annular housing. A bearing structure having an annular cage and an annular housing that optionally mate at frustogeometrical surfaces for supporting and positioning a rotatable shaft of a turbomachine and that optionally provides an externally adjustable squeeze film damper between the frustogeometrical surfaces of the annular cage and the annular housing. The squeeze film damper is defined by two annular squeeze film seals positioned in respective annular squeeze film seal grooves formed in the frustogeometrical radially outer surface of the annular cage. Lubricant is also delivered to the squeeze film damper which serves as the damping medium.

19 Claims, 9 Drawing Sheets

TAPERED BEARING HOUSING

FIELD OF THE INVENTION

This invention relates generally to a support structure for rotatably supporting a shaft in a turbomachine. In one specific aspect, the invention relates to a bearing having mating frustogeometrical surfaces that optionally provide an adjustable squeeze film damper therebetween for supporting the shaft and for dampening vibration of the shaft during shaft rotation.

BACKGROUND OF THE INVENTION

A turbomachine having a rotating shaft must provide some means for supporting and positioning the rotatable shaft while the shaft is rotating about its longitudinal axis. In general, it is desirable for a turbomachine to also provide some means for damping radial movement of the shaft. A general practice is to provide a bearing to support and position the rotating shaft and to permit free rotation of the shaft with minimum friction. One type of bearing simply provides a low friction surface adjacent the shaft in order to support the shaft. The most common low friction surface is a lubricant film, such as an oil film. The method of supplying the lubricant and the quantity of lubricant which is fed to the bearing will often be the greatest factors in establishing the performance characteristics of the bearing. For example, if no lubricant is present, the shaft and bearing will rub against each other in the dry state. However, where lubricant is present between the surfaces in even small quantities, the coefficient of friction between the surfaces will be reduced. If an abundance of lubricant is fed to the bearing so that there is an excess flowing out of the bearing, it is possible to provide a self-generating pressure film in the clearance space between the shaft and bearing. Such pressure film can be sufficient to dampen radial movement of the shaft and to keep the surfaces of the bearing from rubbing against each other. Failure to adequately dampen the radial movement of the shaft can result in a wide variety of rotor vibration problems.

In an attempt to increase the level of damping in rotor systems, squeeze film damper bearings have been developed. A traditional practice is to provide seals that maintain a pressurized lubricant film, or squeeze film, in the clearance space between the bearing cage and housing to dampen radial movement of the shaft. The initial designs of squeeze film damper bearings provided a cylindrical design that provided a squeeze film radially between a cylindrical radially outer surface of a cage and a cylindrical radially inner surface of a housing that afforded the dampening effect. However, there was some difficulty in adjusting the amount of dampening provided by these initial designs as a result of their cylindrical design. Thus, bearings have been designed to provide a squeeze film damper that is adjustable to afford the desired degree of dampening.

U.S. Pat. No. 4,392,751 to Ida et al. is an example of a bearing designed to provide an adjustable squeeze film damper. The damped bearing device of U.S. Pat. No. 4,392, 751, which utilizes a fluid film between inclined surfaces, has a mating taper between a bearing and a bearing back-up member that provides an adjustable squeeze film damper. The bearing is connected to a housing by a resilient bearing support. The bearing back-up member is disposed between the housing and the bearing. The clearance between the bearing and the bearing back-up member is altered by adjusting the axial position of the bearing back-up member with respect to the bearing, the resilient bearing support, and the stationary housing. In order for the bearing back-up member to be adjustable, a radial clearance between the bearing back-up member and the housing is required. This clearance can lead to vibrational problems if the retaining bolts fail to constrain the bearing laterally. Additionally, the bolts are subjected to cyclic loading which can cause them to fail in fatigue. In addition, the presence of a bearing back-up member results in a complex design which is subject to dimensional tolerancing problems. Thus, there is a need in the art for a bearing that provides a squeeze film damper for supporting the shaft and for dampening vibration of the shaft during shaft rotation while at the same time not comprising reliability.

There is also a need in the art for a bearing that optionally can function as a traditional bearing and that optionally can provide a squeeze film damper for supporting the shaft and for dampening vibration of the shaft during shaft rotation. There is also a need in the art for such a bearing wherein the squeeze film damper is adjustable.

SUMMARY OF THE INVENTION

The present invention is a bearing that provides a support structure for rotatably supporting a shaft in a turbomachine, e.g. a compressor. The bearing of the present invention is disclosed in several embodiments, all typically utilized with, though not limited to, a horizontal shaft. The bearings of the present invention include a annular cage and an annular housing. The annular housing has a bore therein that defines a frustogeometrical radially inner surface of the annular housing. The annular cage has a corresponding frustogeometrical radially outer surface that is at least substantially parallel with the frustogeometrical radially inner surface of the annular housing. The frustogeometrical surfaces are coaxial with each other and are inclined with respect to the shaft centerline by a prescribed angle. The annular cage is disposed in the bore of the housing annularly between the frustogeometrical radially inner surface of the annular housing and the shaft. The annular cage is restrained axially by an axially restraining assembly with respect to the fixed housing to ensure that proper positioning of the bearing is maintained. The present invention provides a bearing that optionally has the frustogeometrical surfaces mated for supporting the shaft in a first configuration to ensure a tight fit between mating surfaces and that optionally provides a radial clearance between the frustogeometrical surfaces by altering the relative axial position of the annular cage and the annular housing to provide a second configuration that affords a squeeze film damper for supporting the shaft and for dampening vibration of the shaft during shaft rotation while at the same time minimizing any vibrational problems. The present invention also provides a bearing that optionally has the frustogeometrical surfaces mated for supporting the shaft in a first configuration to ensure a tight fit between mating surfaces and that optionally provides a radial clearance between the frustogeometrical surfaces to provide a second configuration that affords an adjustable squeeze film damper for supporting the shaft and for dampening vibration of the shaft during shaft rotation while at the same time minimizing any vibrational problems.

Oil is provided within the radial clearance between the frustogeometrical surfaces so as to provide squeeze film damping. Specifically, oil can be provided to the radial clearance between the frustogeometrical surfaces by an oil supply passage through the annular housing. The oil is introduced into this radial clearance between two axially spaced annular squeeze film seals that maintain the oil, preferably under pressure, between the annular cage and the annular housing so as to provide a damping effect. Squeeze film damping occurs when the oil is squeezed at one or more locations in the annular radial clearance as relative radial movement occurs as a result of shaft rotation. The amount of damping is related to the radial clearance between the annular cage and the annular housing, which is related to the relative axial position of the annular cage with respect to the housing. A positioning dowel between the annular cage and the annular housing maintains the oil supply passage in the annular housing in fluid communication with the squeeze film damper and prevents the annular cage from rotating.

A radial bearing, such as ball bearings, roller bearings, fixed profile hydrodynamic bearings, tilt pads, etc., is attached to the annular cage to present a low friction surface to the rotating shaft. Oil in the radial clearance between the frustogeometrical surfaces can also lubricate the interface between the radial bearing and the rotating shaft. An oil supply passage in the annular cage can be in fluid communication with the squeeze film damper and with an oil supply passage in the radial bearing which can then supply oil to a radial clearance between the radial bearing and the rotating shaft to further present a low friction surface to the rotating shaft.

DETAILED DESCRIPTION OF THE INVENTION

The present invention is a bearing that overcomes many of the disadvantages found in the prior art and that can be used to support and position the rotatable shaft of a turbomachine, e.g. a compressor, while at the same time minimizing any vibrational problems. The bearing provides the desired stiffness yet affords the desired dampening effect.

FIGS. 1A, 2A, 3, 4A, 5, 6A, 7, and 8A depict only the portion of the respective embodiment of a bearing that extends radially upwardly from the longitudinal axis of the shaft. As most of the elements are annular, the view of a portion in the plane extending radially downwardly from the longitudinal axis would be at least substantially the same as depicted in these figures except rotated 180° about the longitudinal axis of the shaft. Unless otherwise stated, radial directions are directions which are radial to the longitudinal axis of the shaft, and axial directions are parallel to the longitudinal axis of the shaft.

Figure 1A:
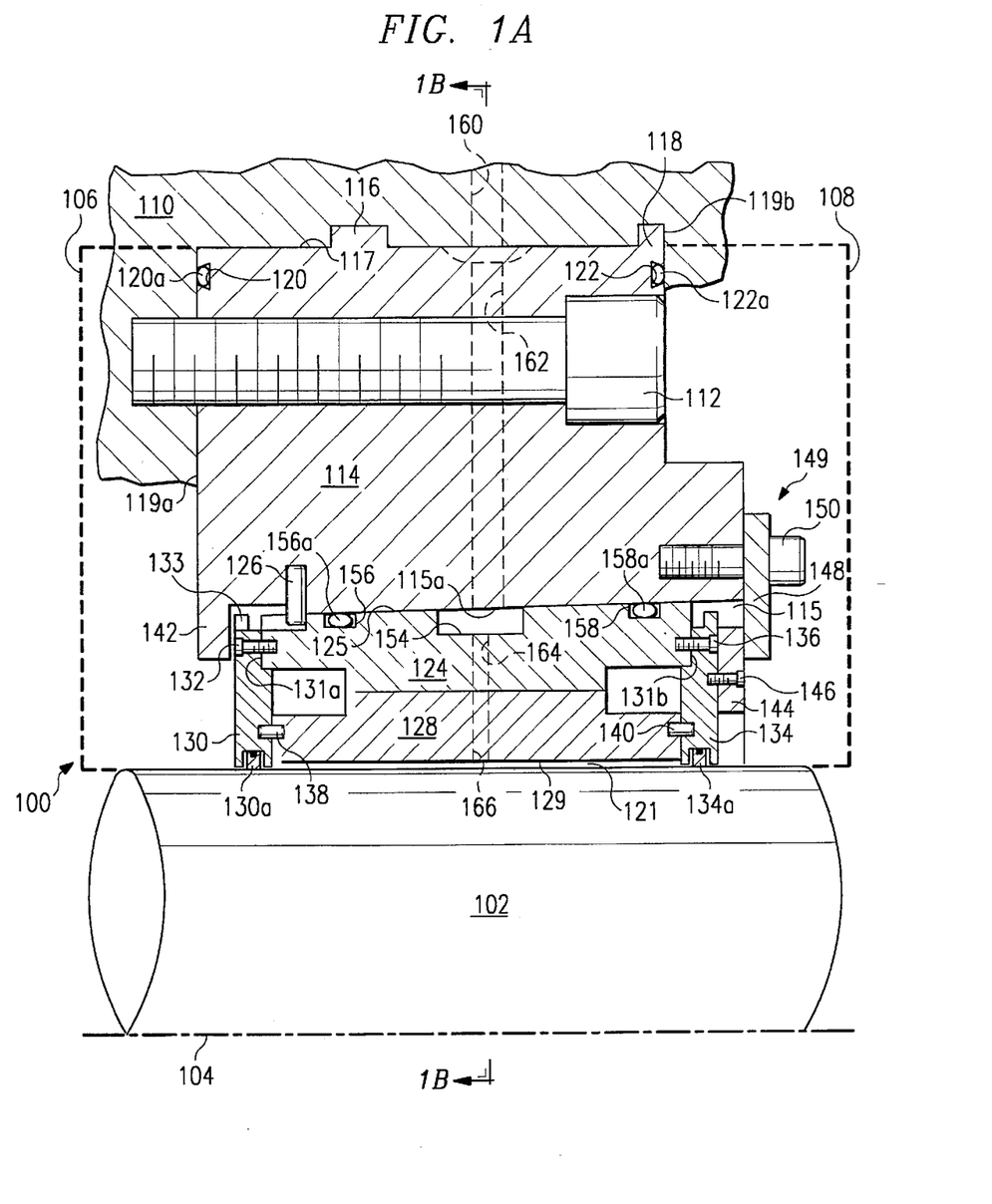
FIG. 1A is a partial cross-sectional view of a bearing supporting a shaft in accordance with a first embodiment of the present invention, taken in a plane containing the longitudinal axis of the shaft, with the mating tapered surfaces contacting each other.

FIG. 1A depicts a first embodiment of the present invention. The annular bearing 100 supports and positions the rotatable shaft 102 that rotates about its longitudinal axis 104. The bearing 100 has a first axial end 106 and a second axial end 108. Preferably the first axial end 106 is disposed inboard of the turbomachine (i.e., disposed toward the internal components of the turbomachine) and the second axial end 108 is disposed outboard of the turbomachine (i.e., disposed away from the internal components of the turbomachine). The bearing 100 is connected to the casing 110 of the turbomachine by a plurality of attachment elements 112 so as to fix the annular housing 114 radially and axially. The casing 110 is illustrated as a unitary element but can consist of a plurality of pieces, depending on the particular turbomachine.

The annular housing 114 can be a unitary element, but is preferably in two pieces for ease of assembly. The annular housing 114 has a bore 115 formed therein extending from the first axial end 106 to the second axial end 108, with the longitudinal axis of the bore 115 coinciding with the longitudinal axis 104 of the shaft 102. The bore 115 of the annular housing 114 preferably defines a frustogeometrical surface 115a.

The radially outer surface 117 of the annular housing 114 preferably includes portions, such as the portion 116 and the portion 118, that assist the fixation of the annular housing 114 in a radially and axially fixed position with respect to the casing 110. The annular housing 114 also preferably includes an annular groove 120 in the first axial end wall 119a that receives the annular seal 120a and an annular groove 122 in the second axial end wall 119b that receives the annular seal 122a so as to provide and maintain a seal between the annular casing 110 and the radially outer surface 117 of the annular housing 114. The annular seals 120a, 122a can be O-rings.

An annular cage 124 is disposed within the bore 115 of the annular housing 114 so as to be disposed annularly between the annular housing 114 and the rotatable shaft 102. The annular cage 124 includes a chamber 121 having a longitudinal axis. The annular cage 124 can be a unitary element, but is preferably in two pieces for ease of assembly. The radially outer surface 125 of the annular cage 124 is an annular surface which mates with surface 115a of bore 115 of the annular housing 114. The radially inner surface 115a of the annular housing 114 is at least substantially parallel to, and is capable of mating with, the frustogeometrical radially outer surface 125 of the annular cage 124. That is, the angle at which the radially outer surface 125 of the annular cage 124 is inclined with respect to the longitudinal axis 104 of the shaft 102 is at least substantially the same angle at which the frustogeometrical radially inner surface 115a of the annular housing 114 is inclined with respect to the longitudinal axis 104 of the shaft 102. The frustogeometrical radially outer surface 125 of the annular cage 124 and the frustogeometrical radially inner surface 115a of the annular housing 114 have longitudinal axes which are coaxial with each other and which, at least, generally coincide with the longitudinal axis 104 of the shaft 102. Preferably, the portion of the frustogeometrical radially inner surface 115a of the annular housing 114 that is radially closest to the shaft 102 and the portion of the frustogeometrical radially outer surface 125 of the annular cage 124 that is radially closest to the shaft 102 are both relatively disposed on the inboard axial end of the bearing 100. This preferred disposition allows the annular cage 124 to be easily removed axially from the outboard axial end of the bearing 100 in view of the fact that, in general, the outboard axial end of the bearing 100 generally provides more freedom of access.

The annular cage 124 is held against rotation by suitable means, e.g., an anti-rotation dowel 126 positioned in radially extending openings in the annular cage 124 and the annular housing 114. Preferably, the anti-rotation dowel 126 is disposed on the first axial end 106 of the annular bearing 100.

The annular cage 124 includes the radial bearing 128 that supports the shaft 102. The radial bearing 128, preferably tilt pads, presents a low-friction surface to the shaft 102. As shown in FIG. 1A, the axially middle portion of the preferred tilt pad 128 radially supports the shaft 102 with respect to the annular cage 124.

An annular axial end seal 130 is secured to the first axial end wall 131a of the annular cage 124 by the securing element 132. An annular axial end seal 134 is secured to the second axial end wall 131b of the annular cage 124 by the securing element 136. The securing elements 132 and 136 are preferably cap screws. The axial end seals 130, 134 assist in containing the lubricant within the oil cavity. Preferably, an annular brass ring 130a is disposed in an annular groove extending radially into and opening radially inwardly in the axial end seal 130 to assist in containing the lubricant within the oil cavity. Also preferably, an annular brass ring 134a is disposed in an annular groove extending radially into and opening radially inwardly in the axial end seal 134 to assist in maintaining a film between the radially inner surface 129 of the tilt pad 128 and the shaft 102. The preferred annular brass ring 130a and the preferred annular brass ring 134a also serve to present a low-friction surface to the shaft 102. The annular axial end seal 130 can include a slot 133 to allow for the anti-rotation dowel 126 to pass therethrough to allow for the removal of the annual cage 124 from the bore 115 of the annular housing 114 in the axial direction.

A retaining pin 138 can be positioned in axially extending openings in the axial end seal 130 and the tilt pad 128. Another retaining pin 140 can be positioned in axially extending openings in the axial end seal 134 and the tilt pad 128. Retaining pins 138 and 140 allow tilt pad 128 to tilt with respect to the annular cage 124 in response to radial movement of the shaft 102.

The annular housing 114 can optionally provide a portion 142 that extends radially inwardly with respect to the frustogeometrical radially inner surface 115a of the annular housing 114.

An annular shim plate 144 can be secured to the axial end seal 134 by the securing element 146. The securing element 146 is preferably a cap screw.

An end plate 148 is attached to the second axial end wall 119b of the annular housing 114 by an axially restraining assembly 149. The axially restraining assembly 149 includes an axially restraining element 150, the annular shim plate 144 and the end plate 148. The end plate 148 can have any shape, but is preferably annular, in which case a plurality of the axially restraining element 150 attach the end plate 148 to the second axial end wall 119b of the annular housing 114. The annular shim plate 144 is thus disposed axially between the axial end seal 134 and the end plate 148 to ensure that the frustogeometrical radially outer surface 125 of the annular cage 124 is mated with the frustogeometrical radially inner surface 115a of the annular housing 114.

Optionally, a shim (not shown) can be provided between the end plate 148 and the second axial end wall 119b of the annular housing 114. The shim should be ground to fit.

Optionally, an annular oil supply groove 154, an annular squeeze film seal groove 156, and an annular squeeze film seal groove 158, can be machined into the frustogeometrical radially outer surface 125 of the annular cage 124. The annular oil supply groove 154, the annular squeeze film seal groove 156, and the annular squeeze film seal groove 158 can be either concentric or eccentric to the longitudinal axis of the chamber 121 of the annular cage 124 and are also preferably axially spaced apart from each other and open radially outwardly. The use of eccentric O-ring grooves allows the annular cage 124 to be centered annularly within the annular housing 114 when the weight of the shaft 102 is applied. The annular squeeze film seal groove 156 is preferably disposed axially between the first axial end wall 131a of the annular cage 124 and the annular oil supply groove 154. The annular squeeze film seal groove 158 is preferably disposed axially between the second axial end wall 131b of the annular cage 124 and the annular oil supply groove 154. The squeeze film seals 156a and 158a can be disposed within the annular grooves 156 and 158. The squeeze film seals 156a and 158a can be O-rings.

As shown in FIG. 1A, an oil supply passageway 160 in the annular casing 110 is in fluid communication with an oil supply passageway 162 in the annular housing 114. The oil supply passageway 162 is in fluid communication with the annular oil supply groove 154. The annular oil supply groove 154 is in fluid communication with an oil supply passageway 164 in the annular cage 124. The oil supply passageway 164 is in fluid communication with an oil supply passageway 166 in the radial bearing 128. Oil from the oil supply passageway 166 fills the radial clearance between the radially inner surface 129 of the radial bearing 128 and the shaft 102. The resulting oil film provides a low friction surface along which the shaft 102 rotates. This oil film also provides a certain amount of damping.

Figure 1B:
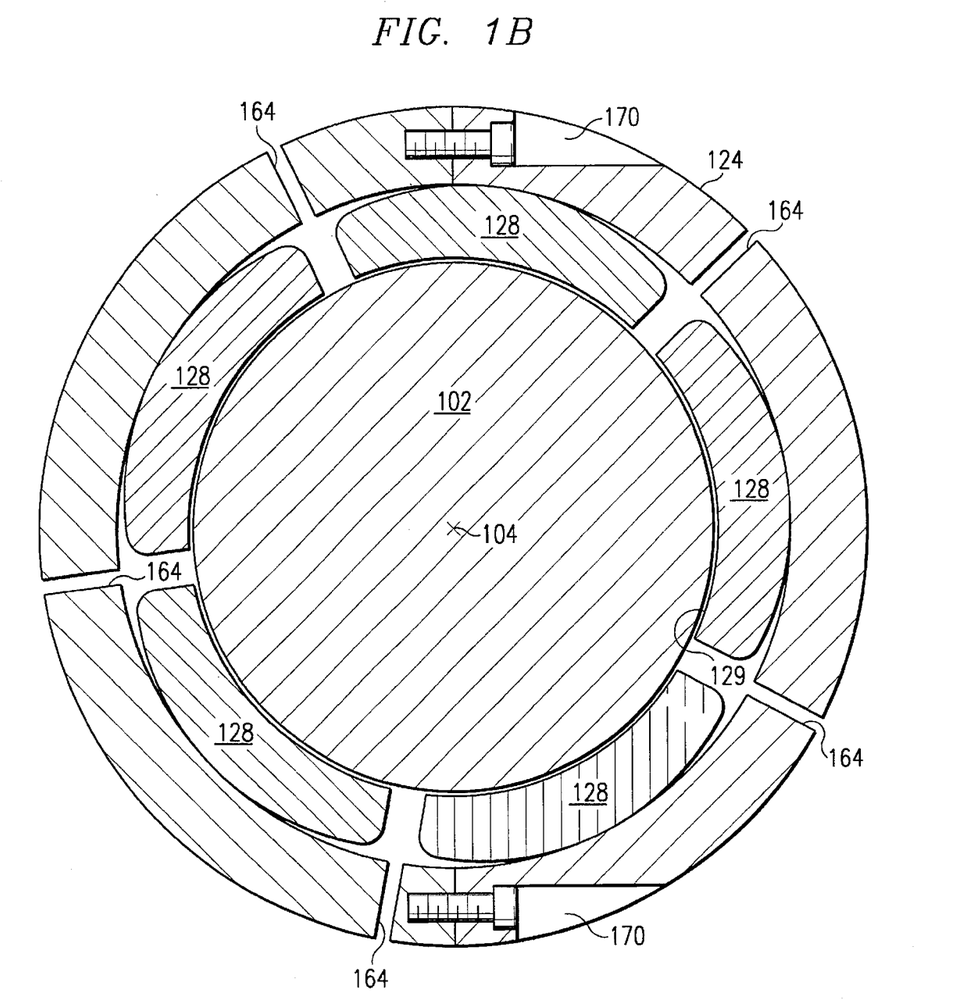
FIG. 1B is a cross-sectional view taken along line 1B—1B in FIG. 1A.

FIG. 1B, wherein the same reference characters are utilized for parts which are in common with FIG. 1A, depicts an annular cross sectional view of the annular cage 124 that is partially depicted in FIG. 1A taken along the line 1B—1B in a plane perpendicular to the longitudinal axis 104 of the shaft 102. Typically, and as shown in FIG. 1B, five tilt pads 128 are utilized. The tilt pads 128 have a radially outer surface that has a higher degree of curvature than the radially inner surface of the annular cage 124. This feature allows the tilt pads 128 to tilt with respect to the annular cage 124 in response to radial movement of the shaft 102. The tilt pads 128 can pivot with respect to the axial end seals 130, 134 on the previously mentioned pivot pins 138, 140.

FIG. 1B also depicts in more detail a way to supply oil to the oil film maintained between the radially inner surface 129 of the tilt pads 128 and the shaft 102. Oil is supplied to the oil film through the oil supply passageway 164 in the annular cage 124.

As previously indicated as preferable and as shown in FIG. 1B, the annular cage 124 is shown in two pieces that are secured together by the securing elements 170.

While FIG. 1B depicts the preferred frustogeometrical design of the frustogeometrical radially outer surface 125 of the annular cage 124 as having a circular cross section in a plane perpendicular to the longitudinal axis 104 of the shaft 102, other designs can be used including designs having a polygonal cross section. For example, the frustoconical design of the frustogeometrical radially outer surface 125 of the annular cage 124 and the frustogeometrical radially inner surface 115a of the annular housing 114 can have an oval, square or pyramidal cross section in a plane perpendicular to the longitudinal axis 104 of the rotatable shaft 102, thereby eliminating the need for the anti-rotation pin 126.

Figure 2A:
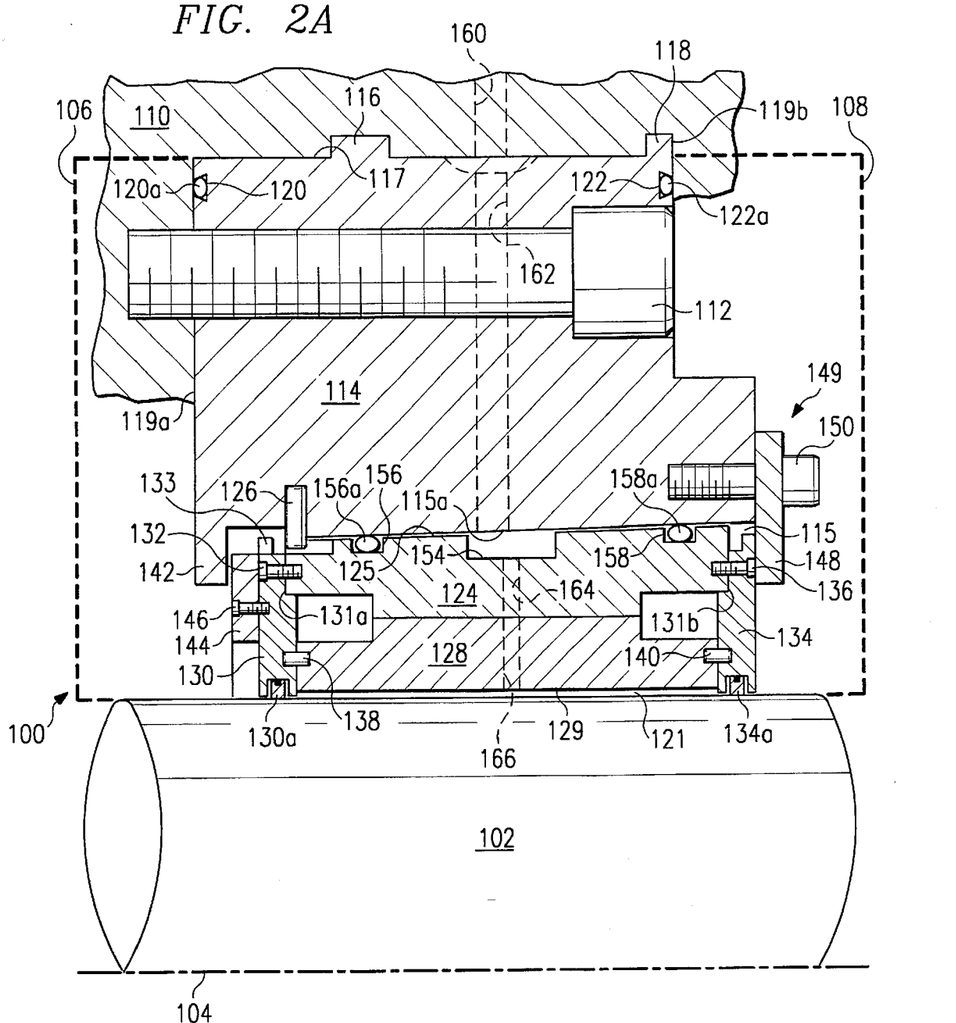
FIG. 2A depicts a modification of the bearing of FIG. 1A wherein the tapered surfaces are separated from each other to provide a squeeze film damper.

FIG. 2A, wherein the same reference characters are utilized for parts which are in common with FIG. 1A, depicts bearing 100 in accordance with FIG. 1A that has been adapted to provide a squeeze film between the frustogeometrical radially outer surface 125 of the annular cage 124 and the frustogeometrical radially inner surface 115a of the annular housing 114 that dampens vibration of the shaft 102. FIG. 2A includes the portion 142 of the annular housing 114 and the oil supply groove 154 and the squeeze film seal grooves 156 and 158. The squeeze film damper serves to significantly improve rotor dynamic performance in many applications. U.S. Pat. No. 5,215,384 contains more information relating to squeeze film damper bearings and is incorporated herein by reference.

FIG. 2A provides a squeeze film damper by repositioning the shim plate 144 on the first axial end wall 131a of the annular cage 124. The shim plate 144 is secured to the axial end seal 130 by the securing element 146. The shim plate 144 is disposed axially between the portion 142 of the annular housing 114 and the first axial end wall 131a of the annular cage 124. As a result, the annular cage 124 is axially disposed relative to the annular housing 114 toward the axial end 108 of the annular bearing 100. This relative axial movement of the annular cage 124 produces a radial clearance between the frustogeometrical radially outer surface 125 of the annular cage 124 and the frustogeometrical radially inner surface 115a of the annular housing 114. Oil is provided into this radial clearance through the oil supply passage 162 in the annular housing 114. The oil can be any medium sufficient to provide a damping effect. The squeeze film damper is preferably maintained at about 20 psi. The squeeze film seals 156a, 158a are positioned in the annular squeeze film seal grooves 156 and 158 so as to provide a fluid seal between the annular cage 124 and the annular housing 114, and are installed with a certain amount of radial crush to ensure proper sealing. Thus, the squeeze film seals 156a, 158a also provide a certain amount of support to the shaft 102.

Thus, as shown in FIG. 2A, the thickness of the shim plate 144 and the angles at which the frustogeometrical radially inner surface 115a of the annular housing 114 and the frustogeometrical radially outer surface 125 of the annular cage 124 are inclined with respect to the longitudinal axis 104 of the shaft 102 determine the size of the radial clearance, and as a result, the amount of dampening provided by the squeeze film. The squeeze film performs in an optimum fashion when the annular cage 124 is centered annularly within the annular housing 114. The amount of radial clearance for a given rotor system is selected to provide the optimum amount of damping.

Figure 2B:
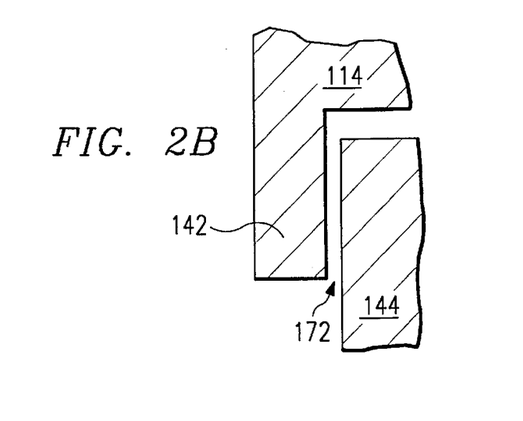
FIG. 2B is an enlarged view of a portion of FIG. 2A.

As shown in FIG. 2B, a small axial gap 172 needs to be maintained between the shim plate 144 and the portion 142 of the annular housing 114 to permit a desired amount of freedom for the annular cage 124 to float axially within the annular housing 114. Preferably, the small axial gap 172 is a few thousandths of an inch. The portion 142 can have any shape that provides the desired amount of freedom for the annular cage 124 but is preferably annular.

Thus, a first embodiment of the present invention is a bearing which is adaptable between a configuration as shown in FIG. 1 forming a snug, tapered fit and a configuration as shown in FIG. 2A forming a squeeze film.

Figure 3:
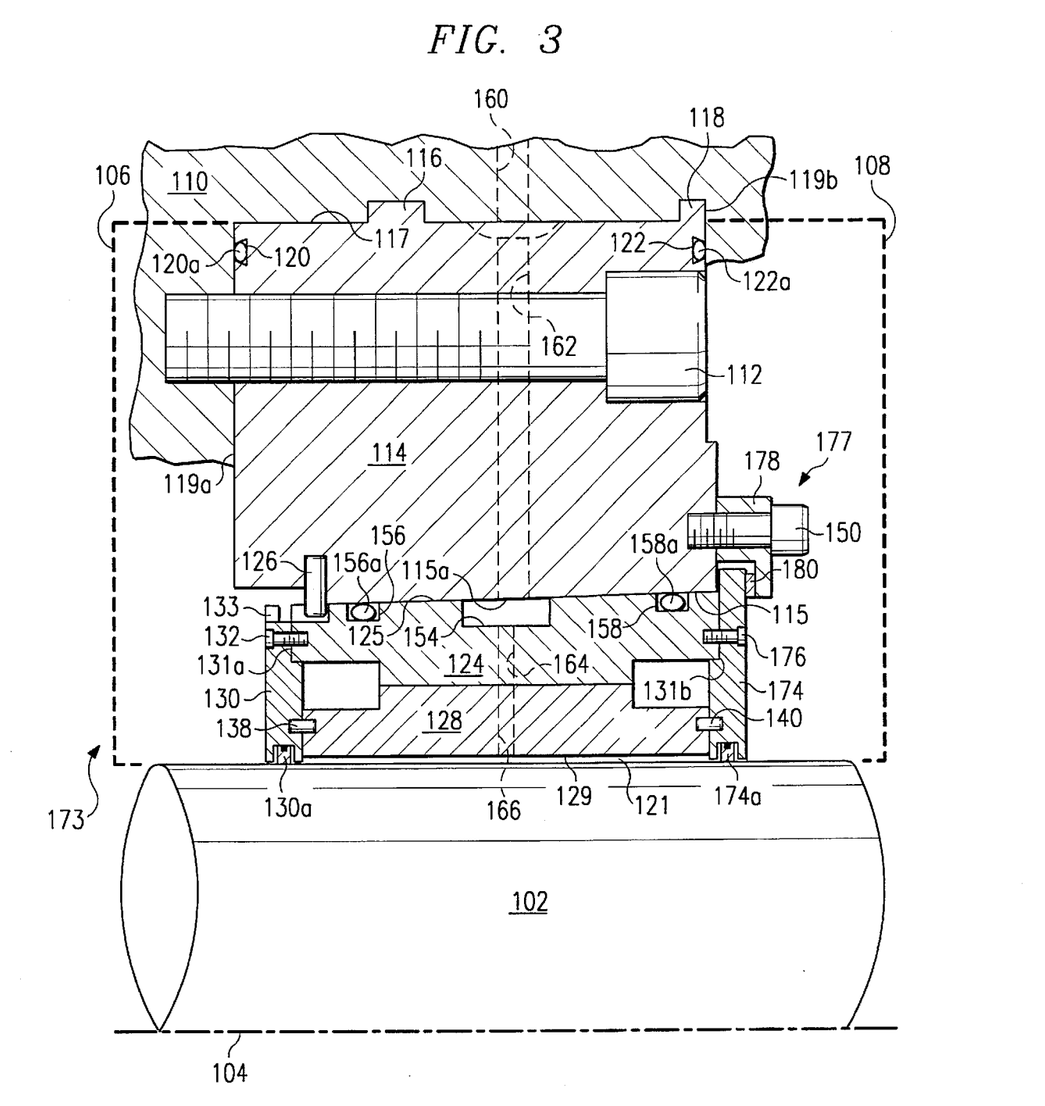
FIG. 3 is a partial cross-sectional view of a bearing in accordance with a second embodiment of the present invention, taken in a plane containing the longitudinal axis of the shaft, with the mating tapered surfaces contacting each other.

FIG. 3, wherein the same reference characters are utilized for parts which are in common with FIG. 1A, depicts an annular bearing 173 which is a second embodiment of the present invention which utilizes the annular axial end seal 174 that is secured to the second axial end wall 131b of the annular cage 124 by the securing element 176. Preferably, an annular brass ring 174a is disposed in an annular groove extending radially into and opening radially inwardly in the annular axial end seal 174 to assist in containing the lubricant within the bearing cavity. The preferred annular brass ring 174a also serves to present a low-friction surface to the shaft 102. The annular axial end seal 174 allows the annular cage 124 to be restrained axially. The annular cage 124 is restrained axially by the axially restraining assembly 177. The axially restraining assembly 177 includes the axially restraining element 150, a retaining ring 178, and the annular axial end seal 174.

The retaining ring 178 is rigidly attached to the second axial end wall 119b of the annular housing 114 by the axially restraining element 150 such that the annular axial end seal 174 is disposed between the second axial end wall 119b of the annular housing 114 and the retaining ring 178 so as to restrain the annular cage 124 axially and so that the frustogeometrical radially outer surface 125 of the annular cage 124 is mated with the frustogeometrical radially inner surface 115a of the annular housing 114. The retaining ring 178 can have any shape, but is preferably annular in which case a plurality of the axially restraining elements 150 rigidly attach the retaining ring 178 to the annular housing 114. Preferably, a wave washer 180 is disposed between the retaining ring 178 and the seal 174 to "spring load" the bearing. The annular grooves 154, 156, and 158 are optionally included on the frustogeometrical radially outer surface 125 of the annular cage 124. The squeeze film seals 156a and 158a can be disposed within the annular grooves 156 and 158.

Figure 4A:
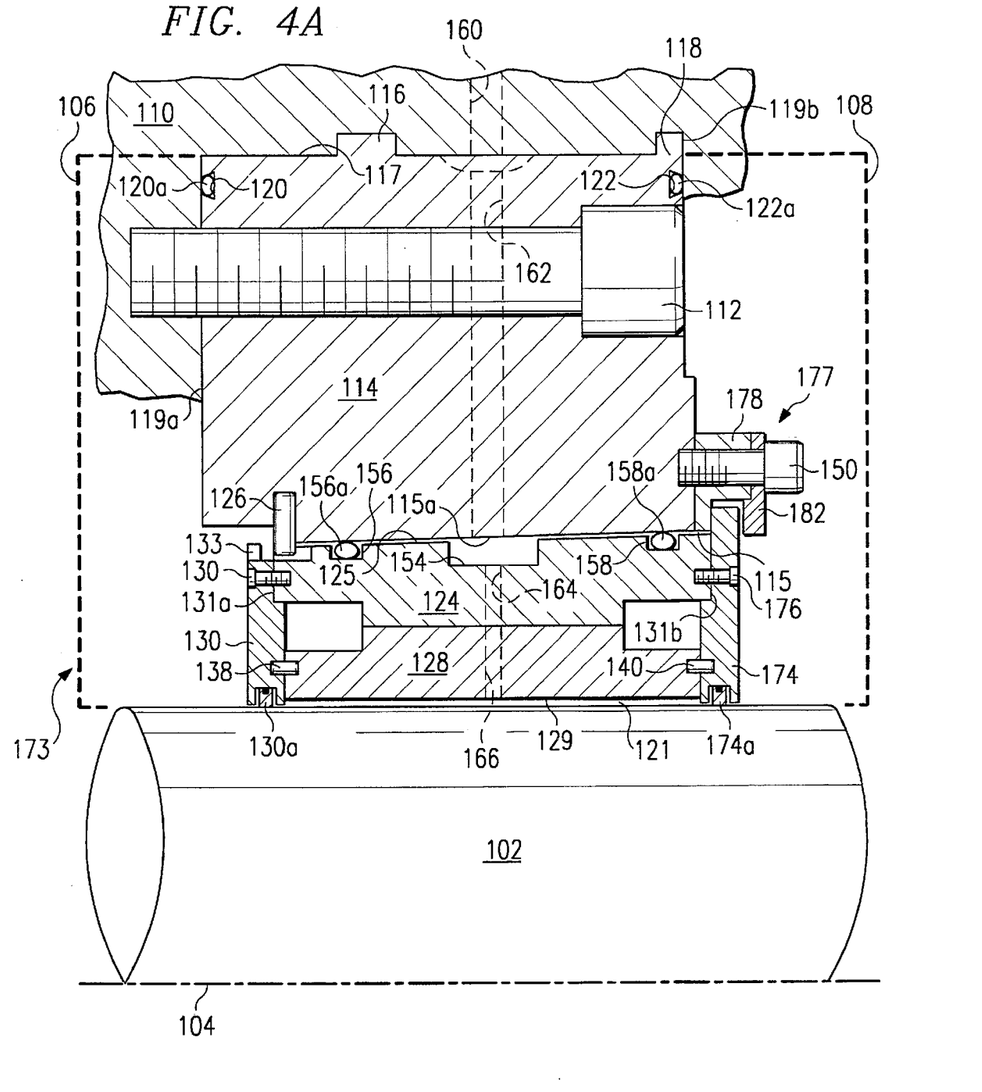
FIG. 4A depicts a modification of the bearing of FIG. 3 wherein the tapered surfaces are separated from each other to provide a squeeze film damper.

FIG. 4A, wherein the same reference characters are utilized for parts which are in common with FIG. 3, depicts the annular bearing 173 in accordance with FIG. 3 that has been adapted to provide a squeeze film between the frustogeometrical radially outer surface 125 of the annular cage 124 and the frustogeometrical radially inner surface 115a of the annular housing 114 that dampens vibration of the shaft 102. FIG. 4A includes the annular oil supply groove 154 and the annular squeeze film seal grooves 156 and 158 in the frustogeometrical radially outer surface 125 of the annular cage 124. FIG. 4A provides a squeeze film damper by positioning the retaining ring 178 such that the retaining ring 178 is disposed between the second axial end wall 119b of the annular housing 114 and the annular axial end seal 174. As a result, the annular cage 124 is axially disposed relative to the annular housing 114 toward the axial end 108. This relative axial movement of the annular cage 124 produces a radial clearance between the frustogeometrical radially outer surface 125 of the annular cage 124 and the frustogeometrical radially inner surface 115a of the annular housing 114. A damping fluid is provided into this radial clearance through the oil supply passageway 162 in the annular housing 114. The squeeze film damper is preferably maintained at about 20 psi. The squeeze film seals 156a, 158a are positioned in the annular grooves 156 and 158 so as to provide a fluid seal between the annular cage 124 and the annular housing 114, and are installed with a certain amount of radial crush to ensure proper sealing. Thus, the squeeze film seals 156a, 158a also provide support to the shaft 102. An end cover 182 forms a part of the axially restraining assembly 177 and restrains the annular cage 124 axially. The end cover 182 can have any shape that provides the desired amount of freedom for the annular cage 124 but is preferably annular.

Thus, as shown in FIG. 4A, the axial thickness of the retaining ring 178 and the angles at which the frustogeometrical radially inner surface 115a of the annular housing 114 and the frustogeometrical radially outer surface 125 of the annular cage 124 are inclined with respect to the longitudinal axis 104 determine the size of the radial clearance, and as a result, the amount of dampening provided by the squeeze film.

Figure 4B:
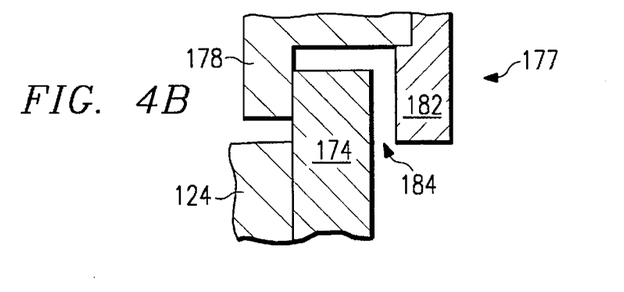
FIG. 4B is an enlarged view of a portion of FIG. 4A.

As shown in FIG. 4B, a small axial gap 184 needs to be maintained between the end cover 182 and the annular axial end seal 174 to permit a desired amount of freedom for the annular cage 124 to float axially within the annular housing 114. Preferably, the small axial gap 184 is a few thousandths of an inch.

Thus, a second embodiment of the present invention is a bearing which is adaptable between a configuration as shown in FIG. 3 forming a snug, tapered fit and a configuration as shown in FIG. 4A forming a squeeze film.

Figure 5:
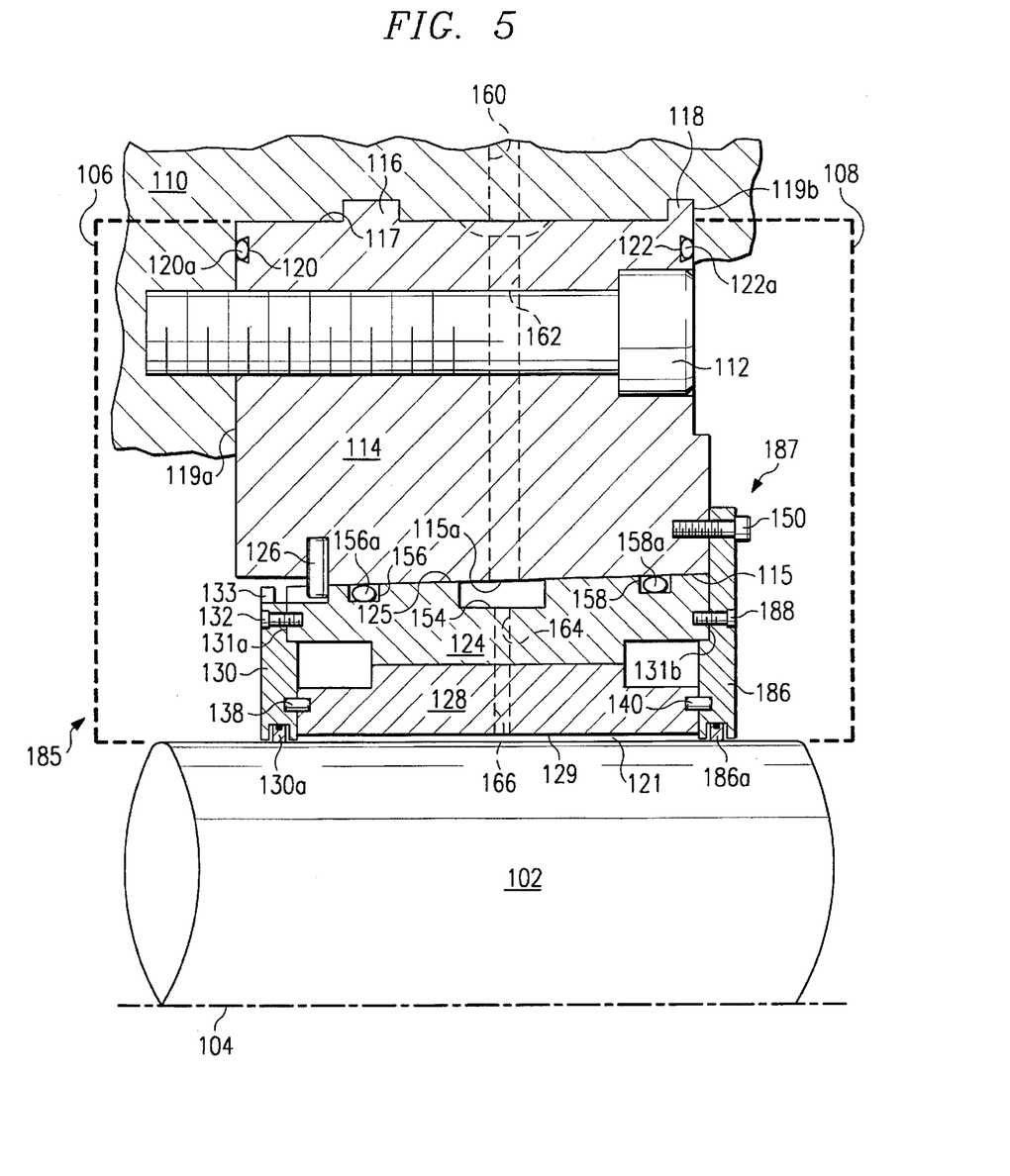
FIG. 5 is a partial cross-sectional view of a bearing supporting a shaft in accordance with a third embodiment of the present invention, taken in a plane containing the longitudinal axis of the shaft, with the mating tapered surfaces contacting each other.

FIG. 5, wherein the same reference characters are utilized for parts which are in common with FIG. 1A, depicts an annular bearing 185 which is a third embodiment of the present invention that utilizes an annular axial end seal 186 that is rigidly secured to the second axial end wall 119b of the annular housing 114 by the axially restraining element 150 such that the annular cage 124 is restrained axially and the frustogeometrical radially outer surface 125 of the annular cage 124 is mated with the frustogeometrical radially inner surface 115a of the annular housing 114. The annular axial end seal 186 and the axially restraining element 150 are included in an axially restraining assembly 187.

Preferably, an annular brass ring 186a is disposed in an annular groove extending radially into and opening radially inwardly in the annular axial end seal 186 to assist in containing the lubricant within the bearing cavity. The preferred annular brass ring 186a also serves to present a low-friction surface to the shaft 102. The annular axial end seal 186 is secured to the annular cage 124 by the securing element 188. Securing element 188 is preferably a cap screw. Optionally, a shim (not shown) can be disposed axially between the annular axial end seal 186 and the second axial end wall 119b of the annular housing 114. In the absence of the optional shim, the annular axial end seal 186 can contact the second axial end wall 119b of the annular housing 114. The annular squeeze film seal grooves 156, 158, and the annular oil supply groove 154 are optionally included in the frustogeometrical radially outer surface 125 of the annular cage 124. The annular squeeze film seal grooves 154, 156 can have the squeeze film seals 154a and 156a disposed respectively therein.

Figure 6A:
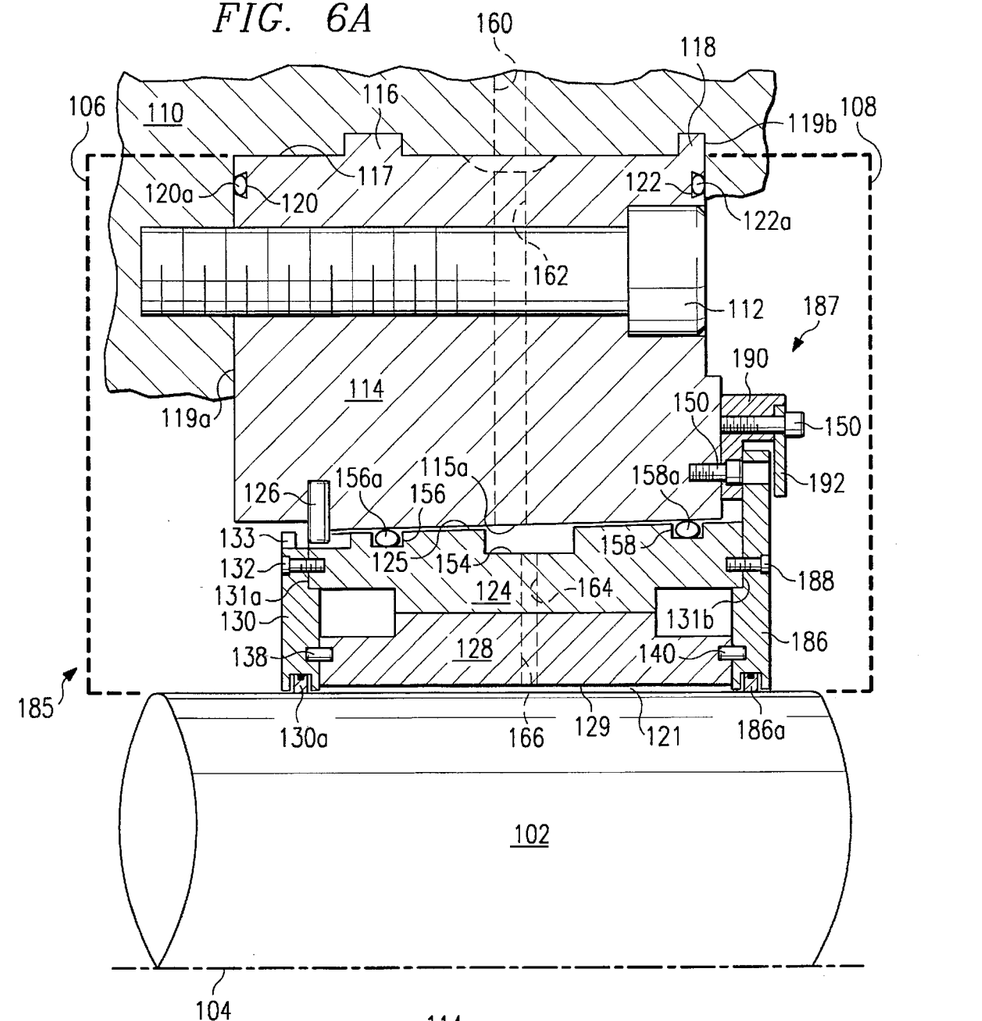
FIG. 6A depicts a modification of the bearing of FIG. 5 wherein the tapered surfaces are separated from each other to provide a squeeze film damper.

FIG. 6A, wherein the same reference characters are utilized for parts which are in common with FIG. 5, depicts the annular bearing 185 in accordance with FIG. 5 that has been adapted to provide a squeeze film between the frustogeometrical radially outer surface 125 of the annular cage 124 and the frustogeometrical radially inner surface 115a of the annular housing 114 that dampens vibration of the shaft 102. FIG. 6A includes the annular oil supply groove 154 and the annular squeeze film seal grooves 156 and 158 in the frustogeometrical radially outer surface 125 of the annular cage 124. FIG. 6A provides a squeeze film damper by securing an adapter plate 190 to the second axial end wall 119b of the annular housing 114 by the axially restraining element 150. An end cover 192 is secured to the adapter plate 190 by an additional axially restraining element 150 to restrain the annular cage 124 axially. The adapter plate 190 can have any shape, but is preferably annular in which case a plurality of the axially restraining elements 150 rigidly attach the adapter plate 190 to the end cover 192. The end cover 192 can have any shape that provides the desired amount of freedom for the annular cage 124 but is preferably annular. The adapter plate 190 and the end cover 192 are here also included in the axially restraining assembly 187.

As a result, the annular cage 124 is axially disposed relative to the annular housing 114 toward the axial end 108. This relative axial movement of the annular cage 124 produces a radial clearance between the frustogeometrical radially outer surface 125 of the annular cage 124 and the frustogeometrical radially inner surface 115a of the annular housing 114. A damping fluid is provided into this radial clearance through the oil supply passageway 162 in the annular housing 114. The squeeze film damper is preferably maintained at about 20 psi. The squeeze film seals 156a, 158a are positioned in the annular grooves 156 and 158 so as to provide a fluid seal between the annular cage 124 and the annular housing 114, and are installed with a certain amount of radial crush to ensure proper sealing. Thus, the squeeze film seals 156a, 158a also provide support to the shaft 102.

Thus, as shown in FIG. 6A, the axial thickness of the adapter plate 190 and the angles at which the frustogeometrical radially inner surface 115a of the annular housing 114 and the frustogeometrical radially outer surface 125 of the annular cage 124 are inclined with respect to the longitudinal axis 104 determine the size of the radial clearance, and as a result, the amount of dampening provided by the squeeze film.

Figure 6B:
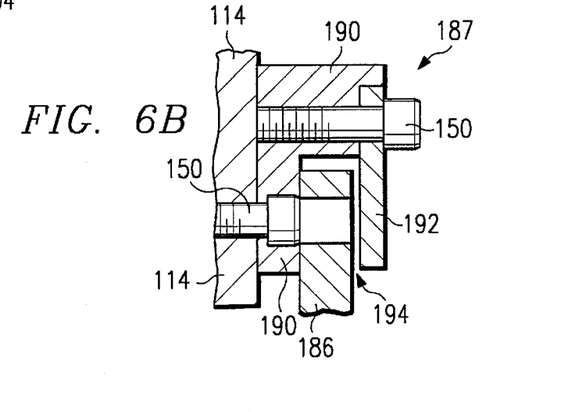
FIG. 6B is an enlarged view of a portion of FIG. 6A.

As shown in FIG. 6B, a small axial gap 194 needs to be maintained between the end cover 192 and the seal 186 to permit a desired amount of freedom for the annular cage 124 to float axially within the annular housing 114. Preferably, the small axial gap 194 is a few thousandths of an inch.

Thus, the third embodiment of the present invention is a bearing which is adaptable between a configuration as shown in FIG. 5 forming a snug, tapered fit and a configuration as shown in FIG. 6A forming a squeeze film.

Figure 7:
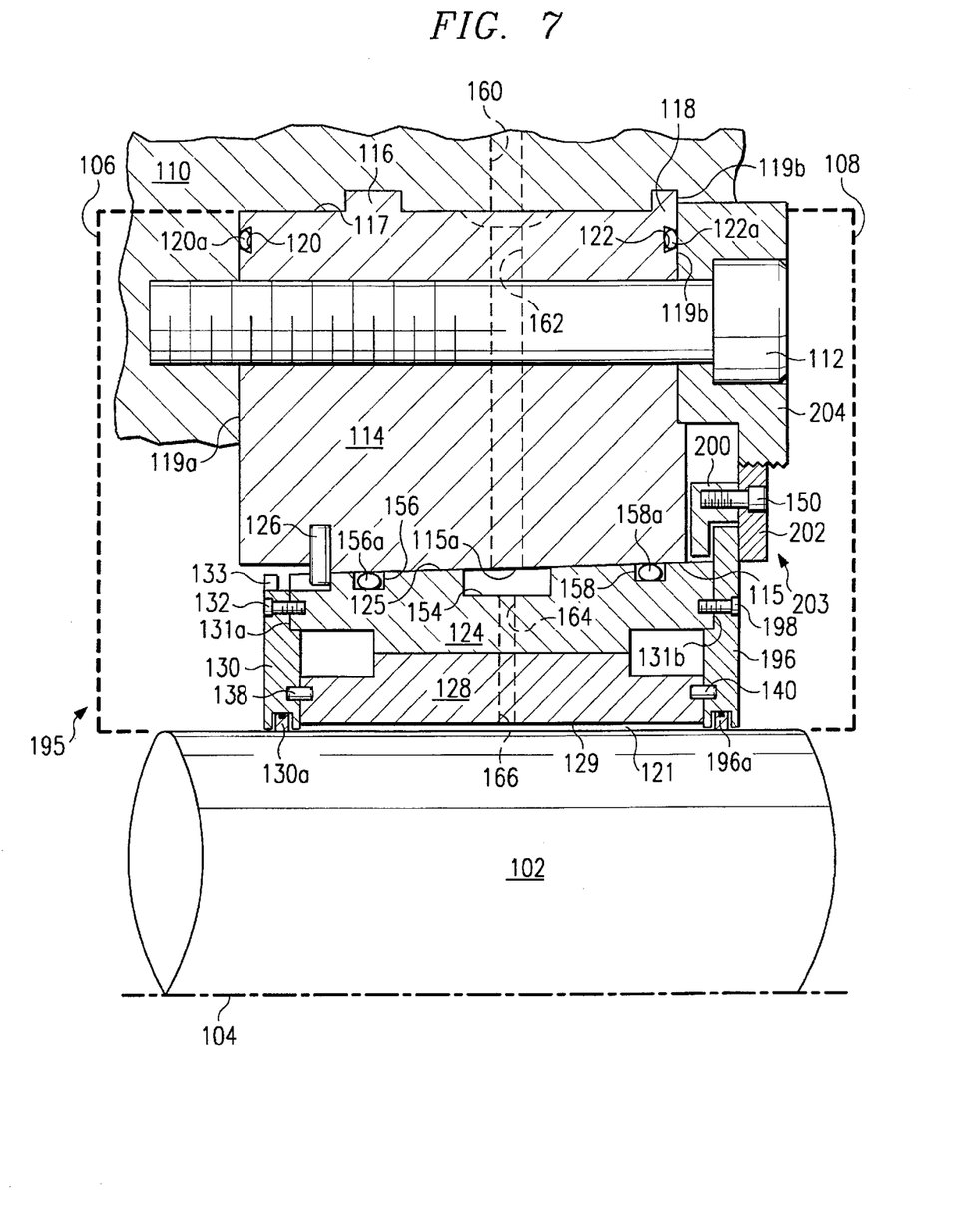
FIG. 7 is a partial cross-sectional view of a bearing supporting a shaft in accordance with a fourth embodiment of the present invention, taken in a plane containing the longitudinal axis of the shaft, with the mating tapered surfaces contacting each other.

FIG. 7, wherein the same reference characters are utilized for parts which are in common with FIG. 1A, depicts the annular bearing 195 which is a fourth embodiment of the present invention that utilizes the annular axial end seal 196. Preferably, an annular brass ring 196a is disposed in an annular groove extending radially into and opening radially inwardly in the annular axial end seal 196 to assist in containing the lubricant within the bearing cavity. The preferred annular brass ring 196a also serves to present a low-friction surface to the shaft 102. The annular axial end seal 196 is secured to the annular cage 124 by the securing element 198. The preferred securing element 198 is a cap screw.

The annular axial end seal 196 is positioned axially between a retaining ring 200 and an end cover 202 by the axially restraining element 150 such that the annular cage 124 is restrained axially and the frustogeometrical radially outer surface 125 of the annular cage 124 is mated with the frustogeometrical radially inner surface 115a of the annular housing 114. The annular axial end seal 196, the retaining ring 200, the end cover 202, and the axially restraining element 150 all form a part of an axially restraining assembly 203. The retaining ring 200 can have any shape, but is preferably annular. The end cover 202 can have any shape, but is preferably annular in which case the end cover 202 is rigidly secured to the retaining ring 200 by a plurality of the axially restraining elements 150. The annular oil supply groove 154 and the annular squeeze film seal grooves 156 and 158 are optionally included in the frustogeometrical radially outer surface 125 of the annular cage 124. The annular squeeze film seal grooves 156, 158 can have the squeeze film seals 156a and 158a disposed respectively therein.

The radially outer surface of the end cover 202 is threaded and mates with the threaded radially inner surface of an annular housing adapter 204 that can be secured to the annular housing 114 by the attachment element 112. The threaded annular housing adapter 204 also forms a part of the axially restraining assembly 203. The threaded end cover 202 is adjustable to change the relative axial position of the annular cage 124 with respect to the annular housing 114 to provide an adjustable squeeze film damper as shown in FIG. 8A, wherein the same reference characters are utilized for parts which are in common with FIG. 7.

Figure 8A:
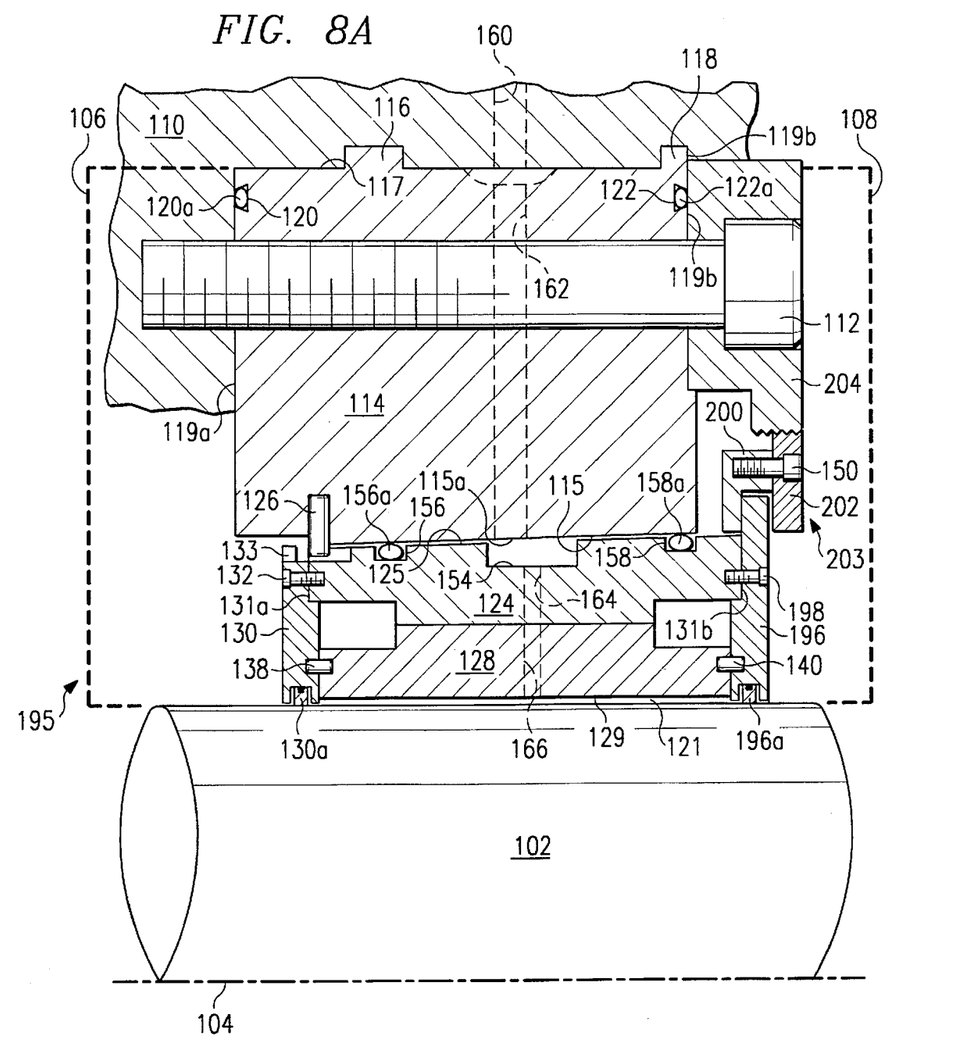
FIG. 8A depicts a modification of the bearing of FIG. 7 wherein the tapered surfaces are separated from each other to provide a squeeze film damper.

As shown in FIG. 8A, the axial movement of the annular cage 124 relative to the annular housing 114 produces a radial clearance between the frustogeometrical radially outer surface 125 of the annular cage 124 and the frustogeometrical radially inner surface 115a of the annular housing 114 that provides an adjustable squeeze film. A damping fluid is provided into this radial clearance through the oil supply passageway 162 in the annular housing 114. The squeeze film damper is preferably maintained at about 20 psi. The annular oil supply groove 154 and the annular squeeze film seal grooves 156 and 158 are included in FIG. 8A. The squeeze film seals 156a, 158a are positioned in the annular squeeze film seal grooves 156 and 158 so as to provide a fluid seal between the annular cage 124 and the annular housing 114, and are installed with a certain amount of radial crush to ensure proper sealing. Thus, the squeeze film seals 156a, 158a also provide support to the shaft 102. Moreover, once the clearance is provided which provides a squeeze film damper, the amount of clearance can also be adjusted to alter the amount of damping provided by the squeeze film. The clearance can be calibrated according to the angular position of the end cover 202 from the relationship that exists between the axial position of the annular cage 124 relative to the annular housing 114 and the pitch of the threads. The pitch of the threads is the number of threads per inch. This radial clearance and the angles at which the frustogeometrical radially inner surface 115a of the annular housing 114 and the frustogeometrical radially outer surface 125 of the annular cage 124 are inclined with respect to the longitudinal axis 104 determine the size of the radial clearance, and as a result, the amount of dampening provided by the squeeze film.

Figure 8B:
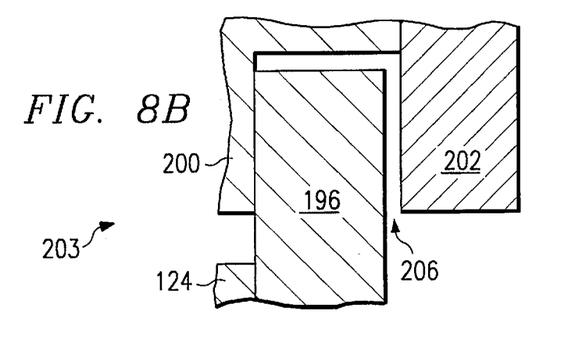
FIG. 8B is an enlarged view of a portion of FIG. 8A.

As shown in FIG. 8B, a small axial gap 206 needs to be maintained between the end cover 202 and the annular axial end seal 196 to permit a desired amount of freedom for the annular cage 124 to float axially within the annular housing 114. Preferably, the small axial gap 206 is a few thousandths of an inch.

Thus, a fourth embodiment of the present invention is a bearing which is adaptable between a configuration as shown in FIG. 7 forming a snug, tapered fit and a configuration as shown in FIG. 8A forming a squeeze film.

Although several preferred embodiments of the invention have been described in the foregoing detailed description and depicted in the accompany drawings, it will be understood that the invention is not limited to the embodiments disclosed, but is capable of numerous rearrangements, modifications, and substitutions of parts and elements without departing from the spirit of the invention. Accordingly, the present invention is intended to encompass such rearrangements, modifications, and substitutions of parts and elements as fall within the spirit and scope of the invention.

That which is claimed is:

1. A bearing for supporting and positioning a rotatable shaft of a turbomachine, the rotatable shaft having a longitudinal axis, said bearing comprising:

an annular housing having a first axial end wall, a second axial end wall, and a bore therein having a longitudinal axis for receiving the rotatable shaft, said bore defining a frustogeometrical radially inner surface of said annular housing, said frustogeometrical radially inner surface being at least substantially coaxial with said longitudinal axis of said rotatable shaft, said frustogeometrical radially inner surface increasing in radial distance from said longitudinal axis of said shaft along a direction from said first axial end wall of said annular housing to said second axial end wall of said annular housing;

an annular cage having a chamber for receiving said rotatable shaft, said annular cage disposed in said bore of said annular housing and annularly disposed between said frustogeometrical radially inner surface of said annular housing and said shaft, said annular cage having a first axial end wall, a second axial end wall, and a frustogeometrical radially outer surface that is at least generally parallel to said frustogeometrical radially inner surface of said annular housing, said chamber of said annular cage having a longitudinal axis;

an axial restraining assembly secured to said second axial end wall of said annular housing that axially restrains said annular cage with respect to said annular housing which in a first configuration engages the surfaces of the annular housing and annular cage and in a second configuration confines the annular cage to limited axial motion relative to the annular housing with a gap formed between the surfaces of the annular housing and annular cage.

2. The bearing of claim 1 wherein the frustogeometrical radially inner surface of said annular housing is frustogeometrical and the frustogeometrical radially outer surface of said annular cage is frustogeometrical.

3. The bearing of claim 1 wherein said first axial end wall of said annular housing is disposed inboard of said turbomachine and said second axial end wall of said annular housing is disposed outboard of said turbomachine.

4. The bearing of claim 1 wherein the axial restraining assembly includes:

an axially restraining element;

an end plate secured to said second axial end wall of said annular housing by said axially restraining element; and, a shim plate being mounted on the annular cage.

5. The bearing of claim 4 wherein said shim plate is disposed axially between said annular cage and said end plate so as to substantially axially constrain said annular cage so that said frustogeometrical radially outer surface of said annular cage mates with said frustogeometrical radially inner surface of said annular housing in the first configuration.

6. The bearing of claim 5 having a shim disposed between said end plate and said annular housing.

7. The bearing of claim 4 further comprising:
   an annular oil supply groove formed in said frustogeometrical radially outer surface of said annular cage opening radially outwardly;
   a first annular squeeze film seal groove formed in said frustogeometrical radially outer surface of said annular cage and open radially outwardly, said first annular squeeze film seal groove axially disposed between said first axial end wall of said annular cage and said annular oil supply groove;
   a second annular squeeze film seal groove formed in said frustogeometrical radially outer surface of said annular cage and open radially outwardly, said second annular squeeze film seal groove axially disposed between said second axial end wall of said annular cage and said annular oil supply groove;
   a first annular squeeze film seal disposed in said first annular squeeze film seal groove of said frustogeometrical radially outer surface of said annular cage and a second annular squeeze film seal disposed in said second annular squeeze film seal groove of said frustogeometrical radially outer surface of said annular cage;
   said first axial end wall of said annular housing having a portion that extends radially inwardly of said frustogeometrical radially inner surface of said annular housing and wherein said shim plate is disposed next to said first annular axial end wall of said annular cage, said shim plate being disposed axially between said portion of said annular housing and said cage so that said annular cage is moved axially toward said second axial end wall of said annular housing so that a squeeze film damper is provided between said frustogeometrical radially inner surface of said annular housing and said frustogeometrical radially outer surface of said annular cage, and so that said end plate generally axially restrains said annular cage in the second configuration.

8. The bearing of claim 7 wherein said first and second annular squeeze film seal grooves are formed in said frustogeometrical radially outer surface of said annular cage so as to be eccentric to said longitudinal axis of said chamber.

9. The bearing of claim 1 wherein the axially restraining assembly includes:
   an axially restraining element;
   a retaining ring secured to said second axial end wall of said annular housing by said axially restraining element so as to at least generally axially restrain said annular cage.

10. The bearing of claim 9 wherein said retaining ring substantially axially restrains said annular cage so that said frustogeometrical radially outer surface of said annular cage mates with said frustogeometrical radially inner surface of said annular housing in the first configuration.

11. The bearing of claim 9 further comprising:
   an annular oil supply groove formed in said frustogeometrical radially outer surface of said annular cage opening radially outwardly;
   a first annular squeeze film seal groove formed in said frustogeometrical radially outer surface of said annular cage and open radially outwardly, said first annular squeeze film seal groove axially disposed between said first axial end wall of said annular cage and said annular oil supply groove;
   a second annular squeeze film seal groove formed in said frustogeometrical radially outer surface of said annular cage and open radially outwardly, said second annular squeeze film seal groove axially disposed between said second axial end wall of said annular cage and said annular oil supply groove;
   a first annular squeeze film seal disposed in said first annular squeeze film seal groove of said radially outer surface of said annular cage and a second annular squeeze film seal disposed in said second annular squeeze film seal groove of said radially outer surface of said annular cage so as to form a seal between said radially outer surface of said annular cage and said frustogeometrical radially inner surface of said annular housing;
   an axial end seal secured to said second axial end wall of said annular cage;
   an end cover, said end cover being secured to said retaining ring by said axially restraining element such that said retaining ring is disposed axially between said second axial end wall of said annular housing and said annular axial end seal so that a squeeze film damper is provided radially between said frustogeometrical radially inner surface of said annular housing and said frustogeometrical radially outer surface of said annular cage, said annular axial end seal being disposed axially between said retaining ring and said end cover such that said end cover generally axially restrains said annular cage in the second configuration.

12. The bearing of claim 11 wherein said first and second annular squeeze film seal grooves are formed in said frustogeometrical radially outer surface of said annular cage so as to be eccentric to said longitudinal axis of said chamber of said annular cage.

13. The bearing of claim 1 wherein said axially restraining assembly comprises an annular axial end seal secured to said second axial end wall of said annular housing by an axially restraining element so that said annular cage is substantially axially restrained and so that said frustogeometrical radially inner surface of said annular housing mates with said frustogeometrical radially outer surface of said annular cage in the first configuration.

14. The bearing of claim 13 further comprising:
   an annular oil supply groove formed in said frustogeometrical radially outer surface of said annular cage opening radially outwardly from said longitudinal axis;
   a first annular squeeze film seal groove formed in said frustogeometrical radially outer surface of said annular cage and open radially outward, said first annular squeeze film seal groove axially disposed between said first axial end wall of said annular cage and said annular oil supply groove;
   a second annular squeeze film seal groove formed in said frustogeometrical radially outer surface of said annular cage and open radially outward, said second annular squeeze film seal groove axially disposed between said second axial end wall of said annular cage and said annular oil supply groove;
   a first annular squeeze film seal disposed in said first annular squeeze film seal groove of said radially outer surface of said annular cage and a second annular squeeze film seal disposed in said second annular squeeze film seal groove of said radially outer surface of said annular cage so as to form a seal between said radially outer surface of said annular cage and said frustogeometrical radially inner surface of said annular housing;

an adapter plate secured to said second axial end wall of said annular housing by said axially restraining element, said adapter plate being disposed axially between said second axial end wall of said annular housing and said annular axial end seal so that a squeeze film damper is provided radially between said frustogeometrical radially inner surface of said annular housing and said frustogeometrical radially outer surface of said annular cage in the second configuration;

an end cover secured to said adapter plate by said axially restraining element such that said annular axial end seal is disposed axially between said adapter plate and said end cover so that said annular cage is generally axially restrained.

15. The bearing of claim 14 wherein said first and second annular squeeze film seal grooves are formed in said frustogeometrical radially outer surface of said annular cage so as to be eccentric to said longitudinal axis of said chamber of said annular cage.

16. The bearing of claim 1 wherein said axially restraining assembly comprises:

an annular adapter plate having a bore disposed therein that defines a threaded radially inner surface of said annular adapter plate, said annular adapter plate being secured to said second axial end wall of said annular housing by a securing element so that said threaded radially inner surface of said annular adapter plate is disposed at least generally coaxial with said longitudinal axis of said rotatable shaft;

an annular end cover having a threaded radially outer surface adjustably mated with said threaded radially inner surface of said adapter plate, said annular end cover being secured to a retaining ring by an axially restraining element;

an annular axial end seal being disposed axially between said retaining ring and said annular end cover so that said annular cage is at least generally axially restrained by said retaining ring and said annular end cover.

17. The bearing of claim 16 wherein said annular end cover is adjusted so that said frustogeometrical radially outer surface of said annular cage mates with said frustogeometrical radially inner surface of said annular housing in the first configuration.

18. The bearing of claim 16 further comprising:

an annular oil supply groove formed in said frustogeometrical radially outer surface of said annular cage opening radially outwardly;

a first annular squeeze film seal groove formed in said frustogeometrical radially outer surface of said annular cage and open radially outwardly, said first annular squeeze film seal groove axially disposed between said first axial end wall of said annular cage and said annular oil supply groove;

a second annular squeeze film seal groove formed in said frustogeometrical radially outer surface of said annular cage and open radially outward, said second annular squeeze film seal groove axially disposed between said second axial end wall of said annular cage and said annular oil supply groove;

a first annular squeeze film seal disposed in said first annular squeeze film seal groove of said radially outer surface of said annular cage and a second annular squeeze film seal disposed in said second annular squeeze film seal groove of said radially outer surface of said annular cage so as to form a seal between said radially outer surface of said annular cage and said frustogeometrical radially inner surface of said annular housing; and, wherein said annular end cover is rotationally adjusted so that an adjustable squeeze film damper is provided radially between said frustogeometrical radially inner surface of said annular housing and said frustogeometrical radially outer surface of said annular cage in the second configuration.

19. The bearing of claim 18 wherein said first and second annular squeeze film seal grooves are formed in said frustogeometrical radially outer surface of said annular cage so as to be eccentric to said longitudinal axis of said chamber of said annular cage.

* * * * *